United States Patent [19]

Doyel

[11] 4,212,431
[45] Jul. 15, 1980

[54] FOOD PROCESSING UNIT

[76] Inventor: John S. Doyel, 404 W. 20th St., New York, N.Y. 10011

[21] Appl. No.: 945,302

[22] Filed: Sep. 25, 1978

[51] Int. Cl.² .......................... B02C 19/12; B26D 4/42
[52] U.S. Cl. ........................................ 241/100; 83/167;
83/857; 83/858; 241/273.1
[58] Field of Search ................ 241/273.1, 273.4, 100;
83/167, 856–858, 408, 404, 437; 99/589

[56] References Cited

U.S. PATENT DOCUMENTS

| | | | |
|---|---|---|---|
| 1,142,681 | 6/1915 | Denis | 83/857 X |
| 1,799,963 | 4/1931 | Epstein | 241/273.4 |
| 2,621,691 | 12/1952 | Brualdi | 83/858 X |
| 2,675,486 | 10/1952 | Marcus | 241/273.1 X |
| 2,714,908 | 8/1955 | Carmack | 241/100 X |
| 2,720,234 | 10/1955 | Fett | 241/273.1 |
| 3,682,402 | 8/1972 | Goldhammer | 241/100 |
| 4,038,892 | 8/1977 | Popeil | 83/858 X |

*Primary Examiner*—Frank T. Yost
*Attorney, Agent, or Firm*—Cooper, Dunham, Clark, Griffin & Moran

[57] ABSTRACT

Food processing unit adapted to include several processing devices to permit various foods to be sliced, grated, shredded or otherwise processed into a food receiving chamber, the top portion of which is designed to removably support a working platform. The working platform is designed with a two stage horizontal base with an opening designed to releasably support the processing devices.

10 Claims, 12 Drawing Figures

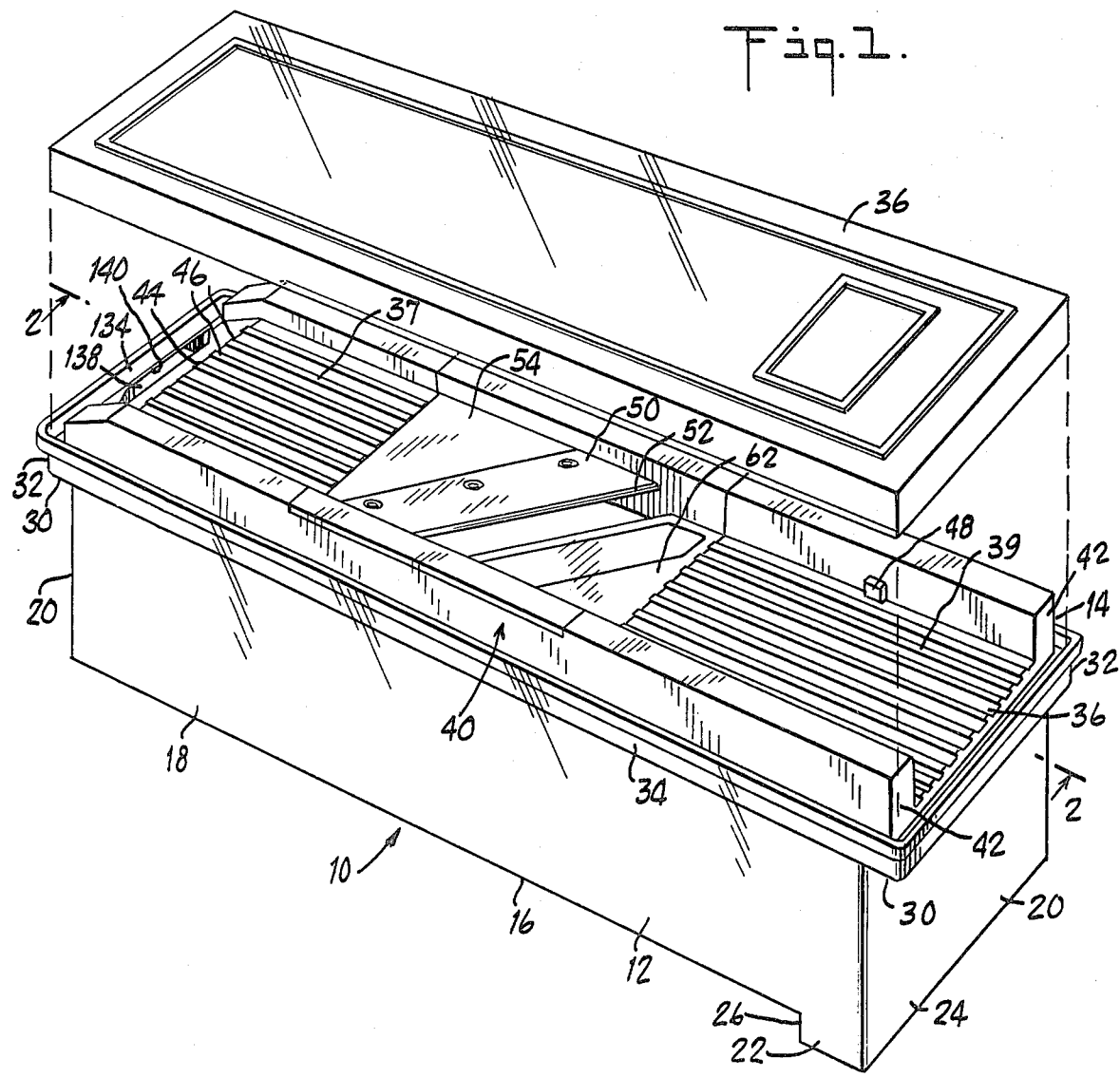
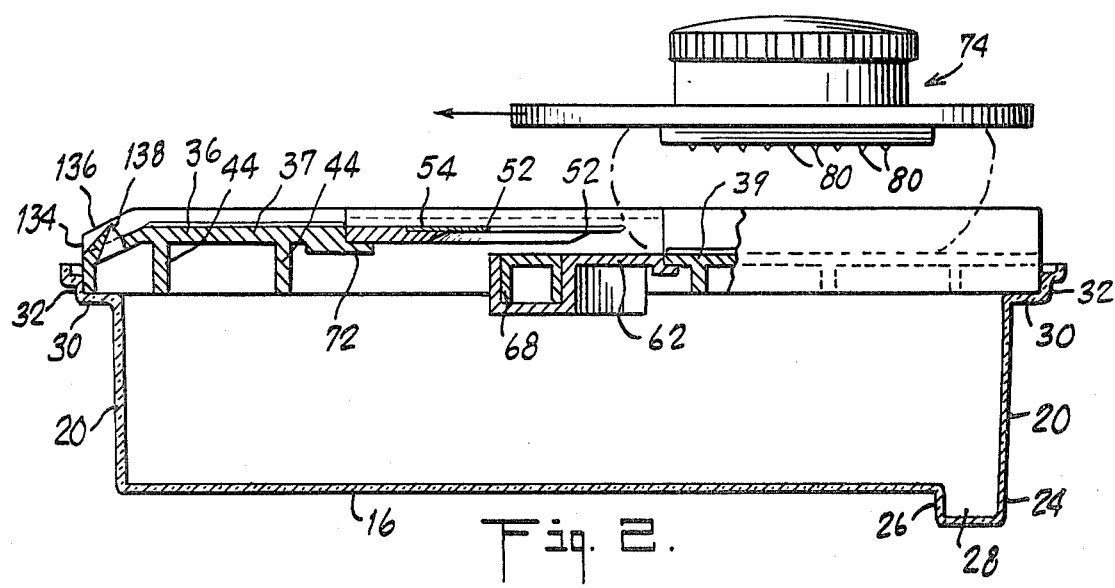

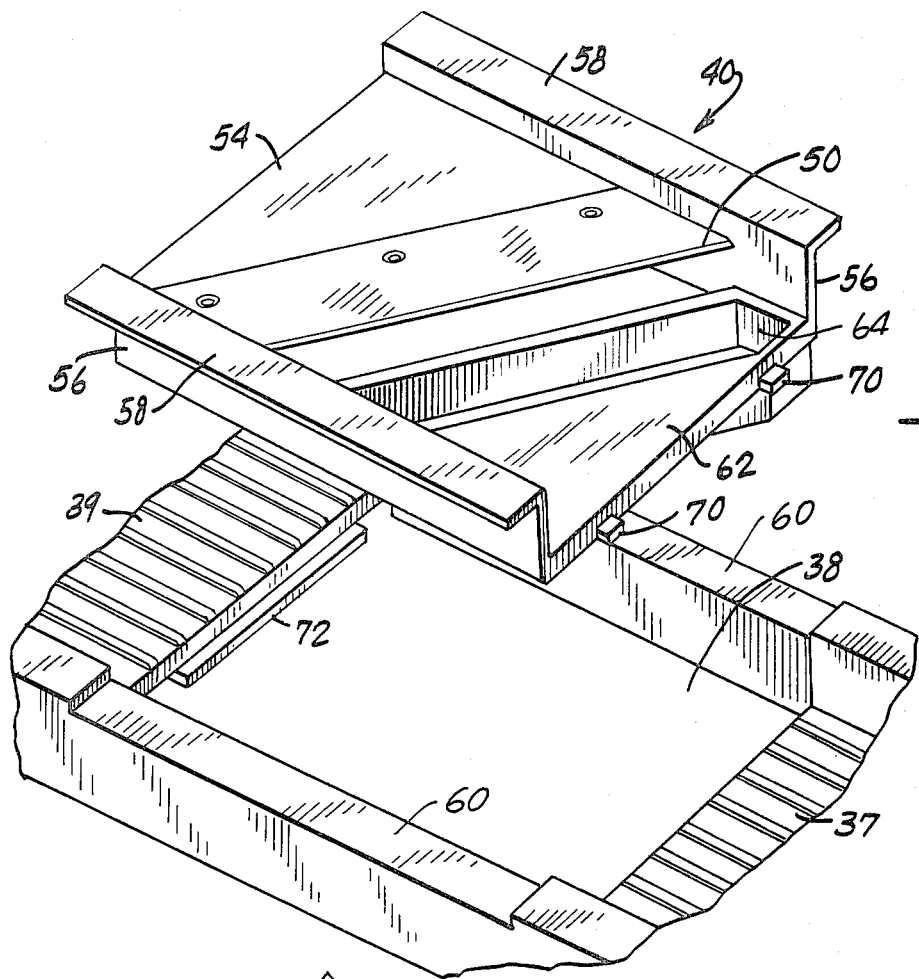
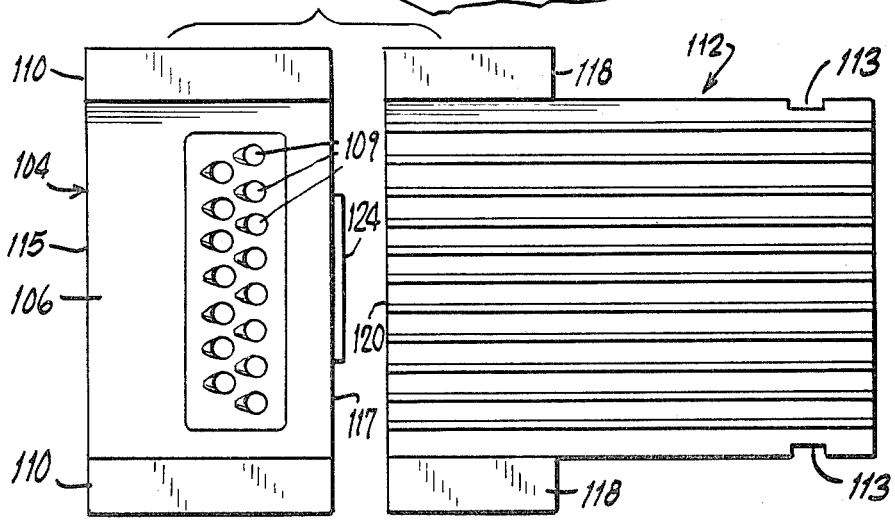
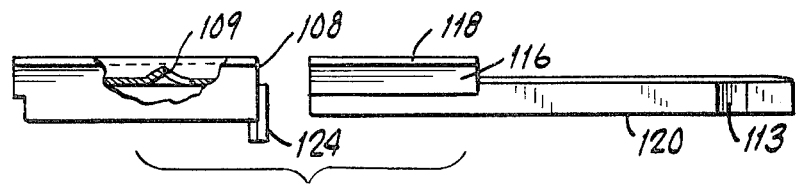

4,212,431

FOOD PROCESSING UNIT

BACKGROUND OF THE INVENTION

This invention relates to kitchen utensils especially adapted for slicing, grating, shredding or otherwise processing foods. It is particularly concerned with food processing units which releasably support a plurality of food processing devices such as cutters, slicers, graters, shredders, and the like.

A variety of kitchen utensils of the class to which this invention pertains are known. They are described, for example, in U.S. Pat. Nos. 2,108,972, 3,890,867 and 3,942,399, all of which refer to slicing devices for fruits and vegetables. U.S. Pat. No. 2,786,503 refers to a device for cutting and grating fruits and vegetables. However, so fas as is known, no kitchen utensil has yet been described which can be used to perform a large number of food processing operations in one unit with a number of interchangeable parts, and to be so used in a facile manner without resort to parts which are difficult to manufacture or too complex to permit ready interchangeability.

SUMMARY OF THE INVENTION

The invention is in the field of kitchen utensils for processing foodstuffs. It provides a food processing unit which is compact, easy to use, capable of a variety of operations, and inexpensive to manufacture.

One specific embodiment of the invention comprises a rectangular food receiving chamber adapted to support a working platform. The working platform is designed to fit into and be supported by the receiving chamber side walls or extensions thereof. It is formed with an opening which will releasably support any of a variety of food processing devices.

The working platform may serve as a support for a slicer utilizable to cut meats, vegetables, fruits, cheeses and the like. The cutting edge on the slicer is arranged so that the slices, as formed, drop directly into the food receiving chamber.

The unit may be provided with a reversible spacer plate for cooperation with the knife edge so as to allow the production of thick or relatively thin slices of food.

The slicing device may also be provided with a cooperating member with a number of upstanding knife edges to slide potatoes for French Fries, or to slice Julienne Ham or Turkey, or for cutting a variety of fruits or vegetables to prepare gourmet salads.

As will be explained more fully hereinafter, the working platform can also releasably support other devices such as a grater or a shredder. A safety holder for holding the food during the processing operation can be utilized if desired.

A special feature of the design of the food receiving chamber is the detent at one end of the bottom of the food receiving chamber. This serves as an edge catch so that the unit can be firmly held in place during various food processing operations.

The working platform may be designed with a beveled end in the slope of which there is a longitudinal thin slot. The thin slot is formed with a knife edge for paring fruits and vegetables. In a preferred embodiment, the working platform is manufactured by molding polymeric material, and the knife edge of the paring slot is formed during the molding so that it is integral with the working platform.

Preferably, the food receiving chamber is of clear plastic so that the progress of the food processing can be observed during the processing operation.

In preferred embodiments of the invention, the dimensions of the food receiving chamber and of the processing devices are especially selected so that the processing devices can be stored in the chamber under the working platform when the unit is not in use. A cover may also be provided to fit over and envelop the working platform during storage so that the working platform, the processing devices and the interior of the food receiving chamber are protected from airborne contaminants during storage.

BRIEF DESCRIPTION OF THE DRAWINGS

FIG. 1 is an exploded perspective view of one embodiment of the invention with the slicing device in place and showing a unit cover.

FIG. 2 is a cross sectional view along 2—2 of FIG. 1 omitting the cover and showing the safety holder.

FIG. 8 is a fragmentary exploded view of the slicer and a portion of the working platform showing how the slicer fits into place.

FIG. 9 is a plan view showing a shredder and spacer plate.

FIG. 10 is a side view of the shredder and spacer plate shown in FIG. 9.

DETAILED DESCRIPTION OF THE INVENTION

Figure 3:
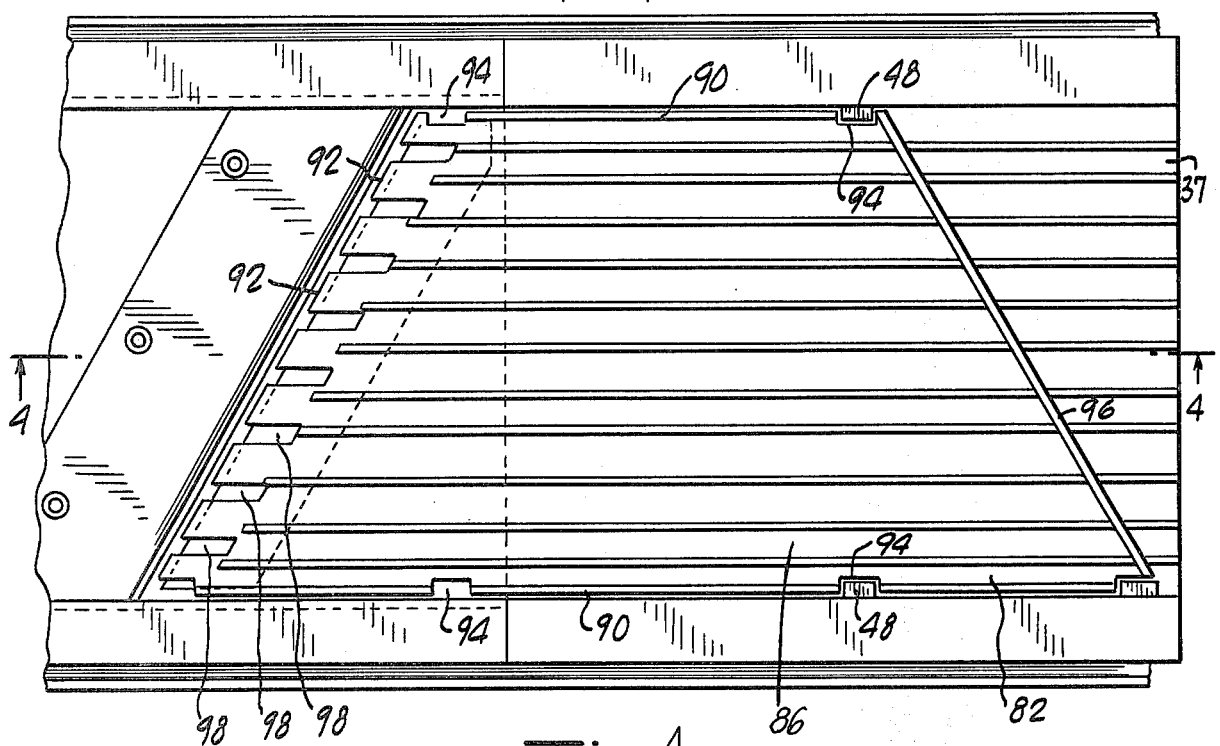
FIG. 3 is a plan view of the right hand portion of a processing unit showing the spacer plate.

Referring to the figures, there is shown one embodiment of this invention generally indicated as 10 and comprising a food receiving chamber 12 and working platform 14.

The food receiving chamber is formed with a rectangular base 16 having two sets of vertically extending side walls, one major set 18 rising from the base along its length or major dimension and another minor set 20 rising from the base along its width or minor dimension. The side walls 18 and 20 and the base 16 are operatively connected to form the receiving chamber 12.

Each of the first pair of side walls 18 has a first downward extension 22 and one of the second pair of side walls 20 has a second downward extension 24. A downwardly extending vertical wall 26 is connected crosswise at one end of the rectangular base 16. The first and second downward extensions 22 and 24, and the vertical wall 26 are joined at their respective bottom edges to form a detent edge holder 28. The food processing unit may be held firmly in place during processing operations by holding the vertical wall 26 against the edge of a table or other surface. This edge holder may be omitted if desired.

At the upper edge of each of the two members of the first and second pairs of side walls 18 and 20, there is an outwardly extending horizontal base surface 30 to which are attached an upwardly extending walls 32 and 34 forming third and fourth pairs of opposed vertically extending side walls. Walls 34 are coextensive with walls 32 and form, together with the horizontal surfaces 30, a working platform receiver into which the working platform 14 fits relatively snugly and is locked in place.

A cover 36 of standard design is shown in FIG. 1.

The working platform 14 comprises an elongated base 36 formed with an upper stage 37 with a lower stage 39 with an opening 38 therebetween to releasably hold various processing devices such as a slicer generally represented by 40. A fifth pair of opposed vertical walls 42 extends upwardly from the base 36. The dimensions of the working platform are, of course, chosen so that the platform will fit into the platform receiver. The opening 38 is defined by the walls 42 and the upper and lower stages 37 and 39.

The working platform 14 may be a molded plastic unit, and in preferred embodiments will be formed with strengthening ribs 44, and with a plurality of working platform ridges 46. The ridges will improve the strength of the construction and, also, make it easier to slide food along the base 36. The working platform base 36 also includes a pair of opposed detents or lugs 48 on the lower stage 39 for purposes to be explained later.

One of the food processing devices which can be employed with the food processing unit of this invention is a slicer 40. The slicer is shown in place in FIG. 1, and in cross section in FIG. 2. It is shown in more detail in FIG. 8. The slicer comprises a knife 50 with an edge 52 mounted on and partially supported by an upper slicer platform 54. The knife edge 52 faces in the direction of the lower stage 39 in working platform 14 on rectangular base 36. The slicer upper platform 54 is in the same plane as the upper stage 37 of the working platform 14 and, effectively, forms an extension thereof.

The sides of the knife are in and supported by opposed, upstanding sidewalls 56. There is a pair of horizontally extending flanges 58 extending outwardly from the vertical wall 56. These flanges 58 fit in elongated grooves 60 in the working platform side walls 42 to support the slicer 40. The slicer device 40 includes a lower slicer platform 62 with a formed slot 64. The platform 62 strengthens the slicer device structure, and provides a support for food to be sliced as it passes from the working platform base 36 up against the knife edge 52. The slot 64 serves as a holder for the Julienne slicer 66 shown as in FIG. 7. When the Julienne slicer 66 is not in use, the slot 64 is filled with a slot filler 68 of appropriate design. The slicer 40 may be formed with lugs 70 in the lower slicer platform 62 which will fit under the working platform base 36. These, in cooperation with the working platform projection 72 which fits under the slicer 40, assists in securing the slicer 40 in place during use.

As will be best seen from FIG. 2, the thickness of any slice obtained using a cutter of the design described will be the vertical distance between the knife edge 52 and the lower slicer platform 62 which is in the same plane as the lower stage 39 in the working platform base 36. A slice will be formed by forcing the food against the knife edge 52. Slices will be collected in the food receiving chamber 12.

If desired, a safety holder 74 of an appropriate design may be provided to prevent accidents caused by passing the hand too close to the knife edge 52. In the design shown, the safety holder 74 comprises a hand knob 76, mounted on a horizontal base 78 with a plurality of pointed projections 80 to secure the food and make it possible to move it reciprocally on the lower stage 39 of the working platform base 36.

Figure 4:
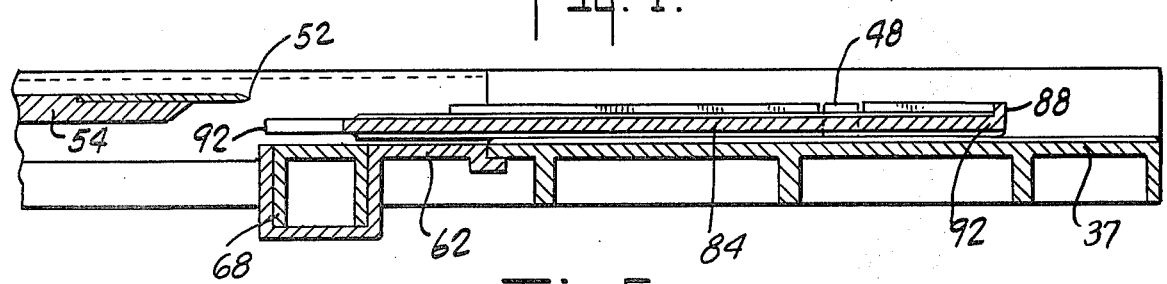
FIG. 4 is a sectional view along 4—4 of FIG. 3.
Figure 5:
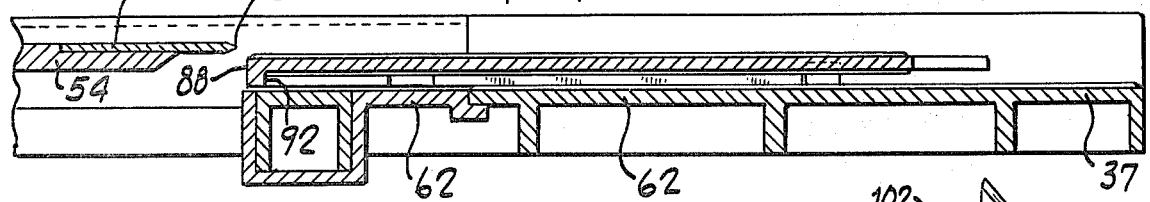
FIG. 5 is the same as FIG. 4, but with the spacer plate reversed.

The invention also provides an element which makes it possible to vary the thickness of the food slices. This spacer plate generally indicated as 82 is shown in FIGS. 4 and 5. It is a horizontal base 84 with a plurality of longitudinal ridges 86 on one surface which, for convenience, will be designated as the top surface. There is a plurality of such ridges 86 on the bottom surface, but these are not shown. A peripheral support wall 88 extends along the two longitudinal edges 90 of the base 84, and one of its lateral edges 92. This wall is interrupted by two pairs of opposed lug slots 94. The lugs 48 in the lower stage 39 of the working platform base 36 fit into the lug slots to hold the spacer plate 82 in selected positions. At one lateral edge 92 of the spacer plate 82, there is a series of parallel grooves 96 for a purpose to be explained later. The lateral edges 92 and 96 are formed so that when the spacer plate 82 is in place they parallel the knife edge 52. Food is cut by placing the food on the spacer plate 82 and forcing it against the knife edge.

The spacer plate 82 can be placed in either of two positions as best shown in FIGS. 4 and 5. In the position shown in FIG. 5, the vertical distance between the knife edge 52 and the spacer plate 82 is less than the same distance as shown in FIG. 4. The reason is that in the embodiment shown in FIG. 5 the spacer plate is supported above the lower stage 39 of the working platform base 36 by peripheral wall 88. However, in the embodiment shown in FIG. 4, the spacer plate 82 lies directly on the lower stage 39 of the working platform base 36 so that the vertical distance from spacer plate 88 to knife edge 52 is increased.

It will be seen from the above that the design of the food processing unit of this invention makes it possible to prepare slices of three different thicknesses. It will be seen further that an important contributing factor to this accomplishment is the provision of upper and lower stages 37 and 39 in the working platform base 36, and of upper and lower platforms 54 and 62 in the slicer 40. The fact that there are these two different sets of platforms makes possible the introduction of the spacer plate 82 to vary the distance between the knife edge 52 and lower slicer platform 62.

Figure 6:
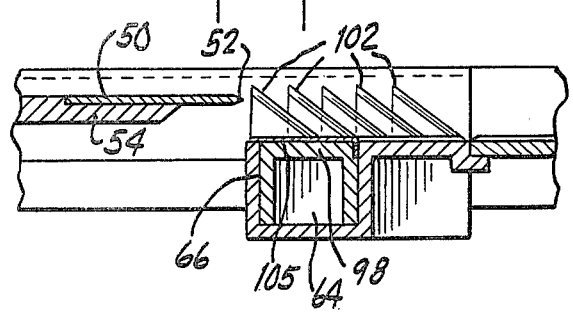
FIG. 6 is a portion of the view shown in FIGS. 4 and 5 showing the Julienne cutter in place.
Figure 7:
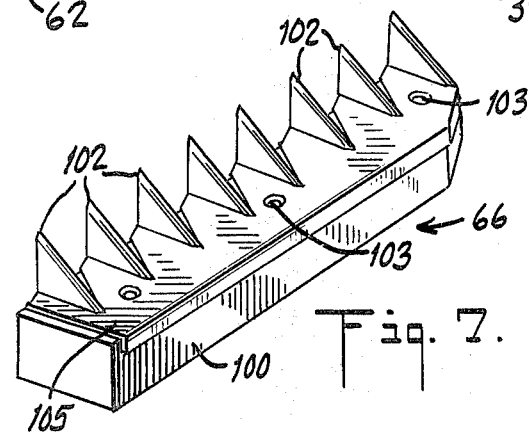
FIG. 7 is a perspective view of the Julienne cutter.

A Julienne slicer 66 of this invention is shown in FIG. 7. FIG. 6 illustrates, in cross section, the Julienne cutter 66 in slot 64 of the lower platform 62 in slicer 40. The cutter 66 comprises a slicer base 100 supporting a series of upstanding parallel knives 102. The design of the base 100 is such that is will fit into slot 64 and bring the knives 102 into a position sufficiently close to knife edge 52 so that food pressed through the knives 102 and against knife edge 52 will be cut both vertically and horizontally. Ham and the like will, therefore, be cut into thin strips commonly referred to as Julienne cuts. Potatoes will be cut to a configuration suitable for the preparation of French Fries.

In a preferred embodiment, the knives 102 are formed by initially making a parallel series of angular cuts in one piece of metal of appropriate dimensions to fit on the slicer base 100. The knife edges are then formed by folding up the separate sections. The thus formed integral unit is then fixed to the slicer base 100 by suitable means such as eyelets 103 passing through sheet segment 105.

The spacer plate 82 may also be utilized in association with the Julienne cutter 66 and knife edge 52 to form even thinner strips. The parallel grooves 98 in lateral edge 92 fit around the upstanding knives 102 when the spacer plate 82 is in a position so that the spacer plate 82 lies directly on the lower stage 39 of the working platform base 36. Thus the design of the embodiment of this invention shown in the figures is such that food strips of two different thicknesses can be produced.

FIGS. 9 and 10 illustrate a shredding device 104 for use in the invention. The device comprises a shredder base 106 with opposed, upstanding vertical walls 108 and rims 110. The shredder base 106 also includes a plurality of scalloped knife edges 109 facing the direction of the lower stage 39 in the working platform base 36. The rims 110 fit into the elongated grooves 60 in the working platform walls 42 so as to support the shredder base 106 in the same plane as the upper stage 37 of the working platform base 36 and adjacent thereto.

A filler plate 112 is provided for use with the shredder 104, and comprises an elongated filler plate base 114 with leading and trailing edges 115 and 117 formed with lug slots 113 and a pair of opposed vertical walls 116 each with flange extensions 118. The filler plate 112 is supported on the lower stage 39 of the working platform base by opposed downwardly extending vertical walls 120 and by the flanges 118 which fit into the elongated grooves 60. The dimensions of the vertical walls 116 and the downwardly extending vertical walls 120 are such that the filler plate base 114 is raised so as to be in the same place as the shredder base 106 so that food to be shredded can be reciprocally moved against the knives 109.

The lug slots 94 cooperatively engage the working platform lugs 48 so that the leading edge 120 of the filler plate 112 is in registry with the trailing edge 117 of the shredder 104. The trailing edge 117 of the shredder 104 may also be provided with an elongated projection 124 to assist in supporting the filler plate 112.

Figure 11:
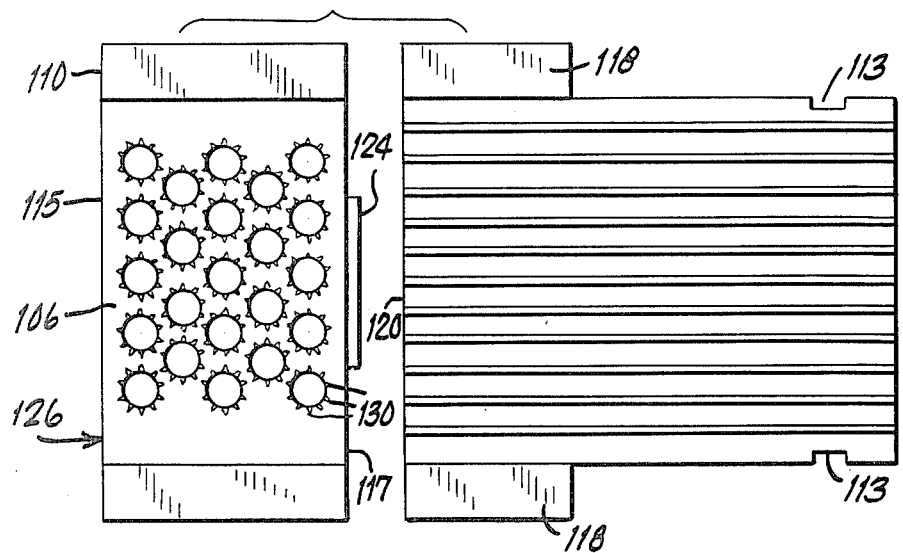
FIG. 11 is a plan view showing a grater and spacer plate.
Figure 12:
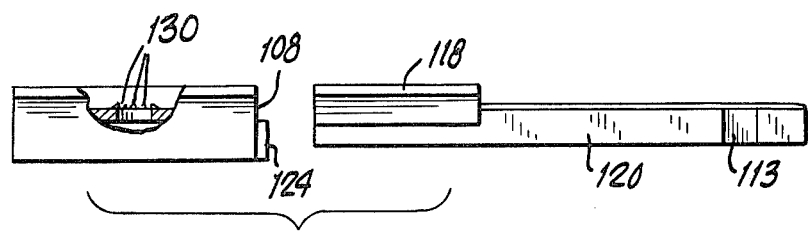
FIG. 12 is a side view of the grater and spacer plate shown in FIG. 11.

FIGS. 11 and 12 illustrated a grater 126. Except that the scalloped knives 109 are replaced, the design of the grater 126 is identical with that of the shredder 104. Accordingly, similar parts are identically numbered. In the grater, the knives 109 of the shredder 104 are replaced with a plurality of annular openings 128 each having on its periphery a plurality of pointed protrusions 130 for grating the food. It will be noted that in this grater, and in all of the processing devices described, provision is made for processed food to pass through the device and collect in the food receiving chamber 12.

A special feature of the working platform 14 of this invention is the provision of an integral food parer 132 formed in leading edge 134 of the upper stage 37 of the working platform base 36. This edge 134, because it is in a relatively high plane, can be formed with a bevel 136. The bevel 136 provides an element into which there may be formed a longitudinal slot 138 with a knife edge 140 above its surface and facing in a direction oppostite to the downward inclination of the bevel 136 and rising slightly above its surface. Food to be pared can be moved forcibly against the knife edge 140 parallel to the bevel.

I claim:

1. A food processing unit adapted to receive a plurality of food processing devices and comprising a food receiving chamber and a working platform, said food receiving chamber comprising:
   1. a rectangular horizontal base having a first pair of opposed, vertical, upwardly extending major side walls rising from the base;
   2. a second pair of opposed, vertical, upwardly extending minor side walls rising from the base;
   3. a pair of outwardly extending horizontal base surfaces each connected to an upper edge of one member of the opposed side wall pairs and each having an upwardly extending wall at its outer edge forming third and fourth pairs of opposed, vertical, upwardly extending side walls;
   4. said working platform comprising an elongated base formed with a fifth pair of opposed vertical side walls said walls being formed with elongated grooves to support said food processing devices extending upwardly therefrom and with upper and lower stages extending crosswise between said side walls, said stages and said side walls defining an opening for releasably supporting a food processing device.

2. A food processing unit of claim 1 wherein:
   1. Each of said first pair of side walls has a first downward extension at one end;
   2. One of said second pair of side walls has a second downward extension;
   3. There is a vertical, downwardly extending wall connected crosswise to the rectangular horizontal base at the end of said base which is nearer said first and second downward extensions, and opposite the second downward extension;
   said first and second extensions and said vertical, downwardly extending wall being connected to each other and, at their respective bottom edges, through a horizontal base element to form a detent at one end of the food receiving chamber.

3. A food processing unit of claim 1 wherein:
   1. There is a bevel in the end of the upper stage which is displaced from the opening;
   2. There is a thin longitudinal slot integrally formed in the bevel; and
   3. The side of the slot nearer the lower end of the bevel is formed as a knife edge which is above the surface of the bevel;
   thereby forming a food parer.

4. A food processing unit of claim 1 including a releasably supported slicing device, said device comprising:
   1. Upper and lower platforms supported by a pair of opposed vertical side walls;
   2. A knife mounted in the upper platform having a knife edge which is facing the direction of the lower platform and is further supported by the side walls;
   3. A pair of horizontal flanges, one on each side wall and adapted to fit into the grooves in the fifth pair of opposed vertical side walls;
   the dimensions of the side walls of the slicer being selected so that the upper platform of the supported slicing device is in the same plane as the upper stage of the working platform and adjacent thereto.

5. A food processing unit of claim 4 including a spacer plate for reversible mounting on the lower stage of the working platform, said spacer plate comprising a horizontal base with a peripheral downwardly extending support wall connected thereto and extending along the longitudinal edges thereof and one of the lateral edges.

6. A food processing unit of claim 5 wherein there is a series of parallel grooves in the edge of the spacer plate opposite the lateral edge to which the peripheral wall is connected.

7. A food processing unit of claim 4 including a Julienne cutter mounted in the slicer adjacent and parallel to the knife edge, said cutter comprising a base and a series of parallel upstanding knives.

8. A food processing unit of claim 1 including a shredder device and a filler plate:
 1. Said shredder device comprising:
  a. A shredder base mounted crosswise in upstanding opposed vertical walls;
  b. A plurality of scalloped knives mounted in the base with their cutting edges facing the lower stage of the working platform;
  c. A rim on each of the opposed walls adapted to fit into the grooves in the fifth pair of opposed side walls;
 the dimensions of the side walls of the shredder being selected so that the upper platform of the supported shredder is in the same plane as the upper stage of the working platform and adjacent thereto;
 2. The filler plate comprising a base and a downwardly extending support wall there being a pair of opposed upstanding walls at one end of the base and a rim on each of the opposed walls adapted to fit into the grooves in the fifth pair of opposed side walls the dimensions of the support and side walls being selected so that when the filler plate is mounted on the lower stage of the working platform the filler plate base is in the same plane as the shredder and its leading edge is in registry with the shredder.

9. A food processing unit of claim 1 including a grater device and a filler plate:
 1. Said grater device comprising:
  a. A grater base mounted crosswise in upstanding opposed vertical walls;
  b. A plurality of annular openings, each opening having on its periphery a plurality of pointed protusions;
  c. A rim on each of the opposed walls adapted to fit into the grooves in the fifth pair of opposed side walls;
 the dimensions of the side walls of the grater being selected so that the upper platform of the supported grater is in the same plane as the upper stage of the working platform and adjacent thereto;
 2. The filler plate comprising a base and a downwardly extending support wall there being a pair of opposed upstanding walls at one end of the base and a rim on each of the opposed walls adapted to fit into the grooves in the fifth pair of opposed side walls the dimensions of the support and side walls being selected so that when the filler plate is mounted on the lower stage of the working platform the filler plate base is in the same plane as the grater and its leading edge is in registry with the grater.

10. A food processing unit of claim 7 wherein the knives are integral with and formed from one sheet of metal which is fixed to the base.

* * * * *